Patented Sept. 25, 1951

2,569,431

UNITED STATES PATENT OFFICE 2,569,431

PROCESS OF PREPARING MONONITRO MONOCYCLIC ARYL LOWER ALKYL ETHERS

Michael Witte, Nassau, N. Y., assignor to General Aniline & Film Corporation, New York, N. Y., a corporation of Delaware No Drawing. Application January 16, 1951, Serial No. 206,289

6 Claims. (Cl. 260—562)

1

This invention relates to an improved process of nitrating aryl ethers and particularly to the preparation of monocyclic aryl lower alkyl ethers in which one of the positions meta and para to the ether group is substituted by a nitro group.

Numerous methods are available for the nitration of aromatic hydrocarbons and their derivatives. The nitro group is usually introduced by the action of concentrated nitric acid admixed with some other acid, such as oleum, sulfuric acid, benzene sulfonic acid, acetic acid, and phosphorus pentoxide, which preferentially combines with the water in the reaction system. The comparative ease with which nitration occurs in the presence of such dehydrating agents has led to the belief that nitration is probably due to the activity of either nitric acid anhydride or mixed acid anhydrides.

Of the methods available only that utilizing a mixed acid, i. e., sulfuric acid, nitric acid, and small amounts of water, has been widely used.

In the mixed acid process for nitration of aryl ethers, the nitration reaction does not go to completion. Apparently, antinitration inhibitors are formed as by-products which cause the reaction to stop when the aryl ether is about half nitrated. Moreover, it is difficult to control the nitration temperature which must be maintained at 40° C., otherwise off-color and off-standard products are obtained.

I have found that aryl ethers from the class consisting of ortho substituted lower alkoxy-aniline derivatives, such as o-anisidine, o-phenetidine, o-aminophenol propyl ether, and o-aminophenol isobutyl ether, can be readily nitrated to yield a mixture of chiefly the 4- and 5-nitro derivatives by introducing into a mixture of acetic acid with o-acetanisidide, o-acetophenetidide, o-acetaminophenol propyl ether, or o-acetaminophenol isobutyl ether, nitric acid in the form of an aqueous solution of at least 85% concentration and preferably of 90-95% concentration over a period of time ranging between 1 and 5 hours at a temperature ranging between 0°-45° C. in the presence of a phosphorus compound, such as phosphorus oxides, e. g., phosphorus trioxide, phosphorus tetroxide, phosphorus pentoxide, etc.; phosphorus halides, e. g., phosphorus trichloride, phosphorus pentachloride, phosphorus tribromide, phosphorus pentabromide, etc.; phosphorus oxyhalides, e. g., phosphorus oxychloride, phosphorus oxybromide, and the like. The presence of a small amount of a phosphorus compound acts as a catalyst and overcomes the formation of antinitration inhibitors and permits the reaction to go to completion. The reaction proceeds with greater ease and at a somewhat lower temperature than usual. Moreover, the tendency towards hydrolysis of the ether linkage is inhibited by the presence of the catalyst. The result is a much higher yield and purer product.

In practicing the invention, one mol of the aryl ether, i. e., o-anisidine, o-phenetidine, and the like, is mixed with 1.29 mols of glacial acetic acid containing at least one molecular equivalent of acetic anhydride, preferably in a small excess up to 10% and the mixture heated to about 100° C., stirred well, and then cooled to room temperature. To the reaction mixture 1.0% to 1.5% of a phosphorus compound is added as a catalyst, and 1.1 to 1.2 mols of $HNO_3$ in the form of an aqueous solution of at least 85% concentration over a period of 2 to 5 hours. The temperature of the nitration reaction mixture is maintained between 0°-45° C., and preferably between 20°-35° C. The mixture of the 4- and 5-nitro isomers begins to crystallize out near the end of the nitric acid addition. After the addition is complete, the nitration charge is stirred for about ½ to 1 hour and then drowned in water, a suitable amount being, for example 2 to 3 times the weight of the reaction mixture.

After drowning the nitration mass in water and stirring well, the charge is filtered and the filter cake washed with cold water until free of acid.

In order to separate the mixed nitroacetylated compounds which run about 95-100% of theory, the filter cake is hydrolyzed with aqueous acid and the mixture filtered to separate the 5-nitro isomer which runs about 88%. The 4-nitro isomer is removed from the filtrate by salting out and filtering with a yield of about 12%.

Instead of converting the ortho substituted lower alkoxy aniline to the acylated derivatives, o-acetanisidide, o-acetophenetidide, and the like may be nitrated directly by the foregoing procedure by conducting the nitration in the presence of 1.2 to 1.3 mols of acetic acid.

The foregoing method has the advantage over the prior art process in that increased yields of 15-20% are obtained by the use of the phosphorus compound as catalyst. Nitrations of p-acetanisidide and p-acetophenetidide in the presence of a phosphorus compound failed to show any increase in the yield over the prior art method.

The following examples illustrate in more detail how my improved process is to be practiced. It is to be understood that these examples are merely illustrative and are not intended to be limitative. The parts given are parts by weight.

Example I 1000 parts of o-anisidine were mixed with 840 parts of glacial acetic acid and 870 parts of acetic anhydride. The mixture was heated to about 100° C., stirred well, and then cooled to room temperature. To the thus formed o-acetanisidide are added 25 parts of PCl₃ followed by the addition of 757 parts of 95% nitric acid over a period of 4 to 5 hours, the temperature being maintained between 25–35° C. The product began to crystallize out near the end of the nitric acid addition. After the addition was complete, the charge was stirred for about ½ hour and then poured into 8000 parts of water, filtered, washed with water, and dried.

A yield of 85% of the 4- and 5-nitro-o-acetanisidide is obtained which can be deacylated and separated into the two isomers in the usual manner.

Example II 550 parts of o-phenetidine were mixed with 315 parts of glacial acetic acid and 415 parts of acetic anhydride. The mixture was heated to about 100° C., stirred well and then cooled to room temperature. 25 parts of PCl₃ were added to the acylated reaction mixture followed by the addition of 300 parts of 95% nitric acid over a period of 4 to 5 hours, the temperature being maintained between 25°–35° C. The product began to crystallize out near the end of the nitric acid addition. After the addition was complete, the charge was stirred for about ½ hour and then poured into 2000 parts of water, filtered, washed with water, and dried.

Example III

Example I was repeated with the exception that 1000 parts of o-anisidine were replaced by 1000 parts of o-acetanisidide and the nitration conducted in 850 parts of glacial acetic acid.

Example IV

Example I was again repeated with the exception that an equivalent amount of o-acetoaminophenol propyl ether was used in place of o-anisidine.

Example V

Example II was repeated with the exception that 25 parts of phosphorus trichloride were replaced by 12.9 parts of phosphorus pentoxide.

Example VI

Example II was repeated with the exception that 25 parts of phosphorus trichloride were replaced by 27.9 parts of phosphorus oxychloride.

This application is a continuation-in-part of my application Serial No. 158,909, filed April 28, 1950, now abandoned.

I claim:

1. The process of preparing nitro derivatives of 2-alkoxyacetanilides which comprises introducing into a mixture of acetic acid with 2-alkoxyacetanilide, in which the alkoxy group contains 1 to 4 carbon atoms, nitric acid in the form of an aqueous solution of at least 85% concentration at a temperature between 0°–45° C. in the presence of a phosphorus compound selected from the group consisting of phosphorus oxides, phosphorus halides, and phosphorus oxyhalides as a catalyst.

2. The process of preparing a mixture of 4- and 5-nitro derivatives of 2-alkoxyacetanilides which comprises introducing into a mixture of acetic acid with 2-alkoxyacetanilide, in which the alkoxy group contains 1 to 4 carbon atoms, nitric acid in the form of an aqueous solution of at least 85% concentration at a temperature between 20°–35° C. in the presence of a phosphorus compound selected from the group consisting of phosphorus oxides, phosphorus halides, and phosphorus oxyhalides as a catalyst.

3. The process of preparing a mixture of 4- and 5-nitro-o-acetanisidide which comprises introducing into a mixture of acetic acid with o-acetanisidide, nitric acid in the form of an aqueous solution of at least 85% concentration at a temperature between 20°–35° C. in the presence of phosphorus trichloride as a catalyst.

4. The process of preparing a mixture of 4- and 5-nitro-o-acetophenetidide which comprises introducing into a mixture of acetic acid with o-acetophenetidide, nitric acid in the form of an aqueous solution of at least 85% concentration at a temperature between 20°–35° C. in the presence of phosphorus trichloride as a catalyst.

5. The process of preparing a mixture of 4- and 5-nitro-o-acetaminophenol propyl ether which comprises introducing into a mixture of acetic acid with o-acetaminophenol ether, nitric acid in the form of an aqueous solution of at least 85% concentration at a temperature between 20°–35° C. in the presence of phosphorus trichloride as a catalyst.

6. The process of preparing a mixture of 4- and 5-nitro-o-acetophenetidide which comprises introducing into a mixture of acetic acid with o-acetophenetidide, nitric acid in the form of an aqueous solution of at least 85% concentration at a temperature between 20°–35° C. in the presence of phosphorus pentoxide as a catalyst.

MICHAEL WITTE.

No references cited.